E. BOONE.
PROCESS FOR MAKING HORSESHOES AND THE LIKE.
APPLICATION FILED JUNE 15, 1915.
1,163,314.
Patented Dec. 7, 1915.
5 SHEETS—SHEET 2.
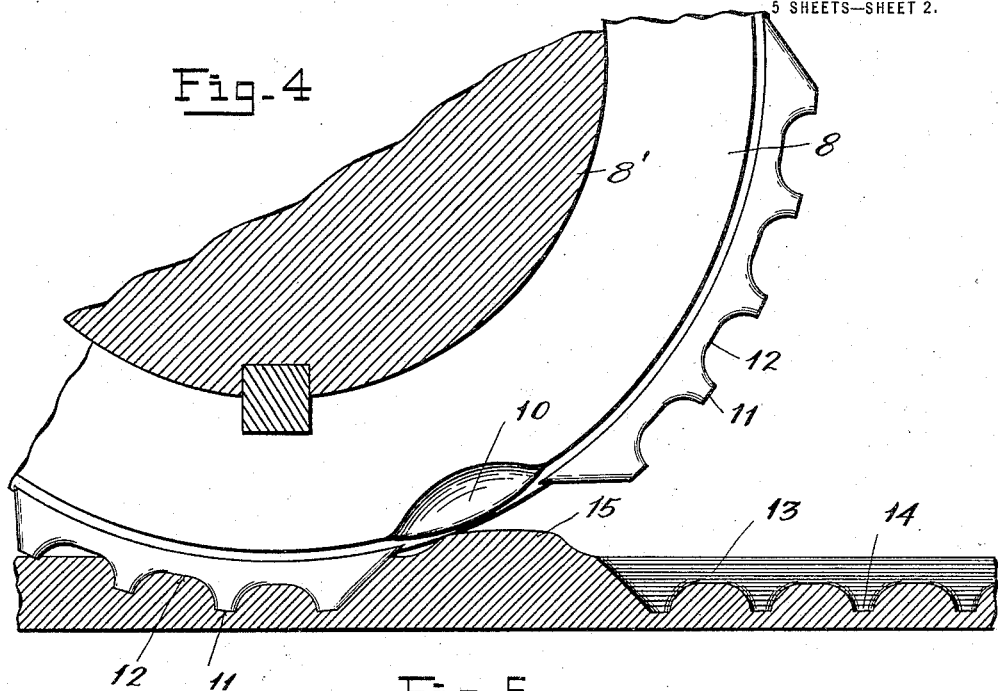
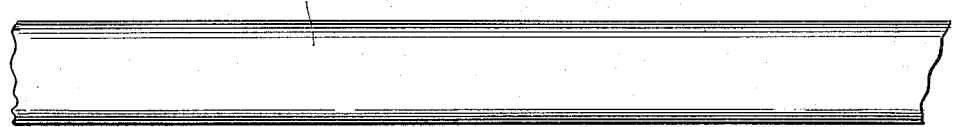
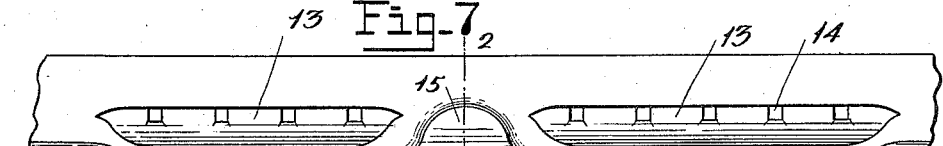
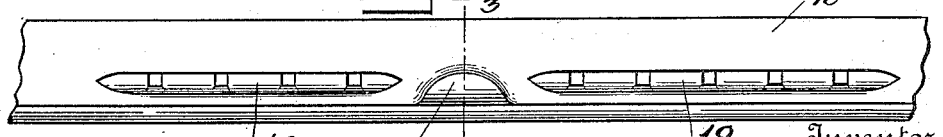
Inventor
Enoch Boone.
By his Attorneys
Bartlett & Brownell E. BOONE.
PROCESS FOR MAKING HORSESHOES AND THE LIKE.
APPLICATION FILED JUNE 15, 1915.
1,163,314.
Patented Dec. 7, 1915.
5 SHEETS—SHEET 3.
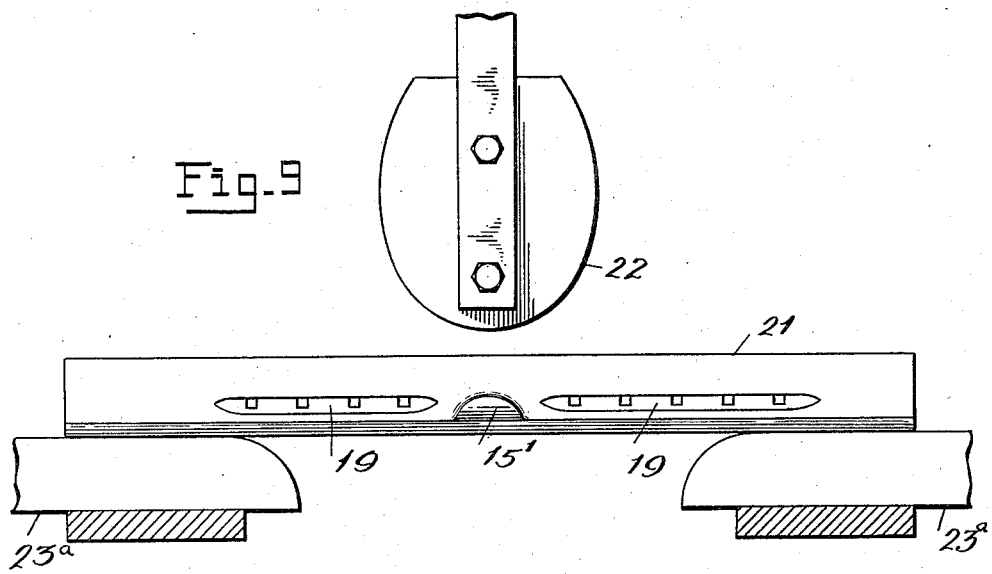
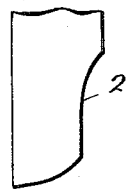
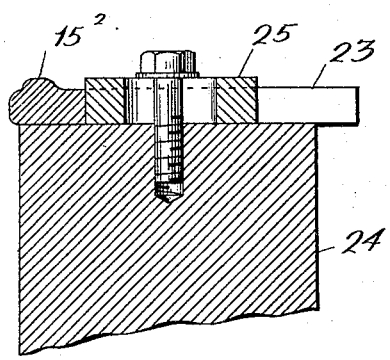
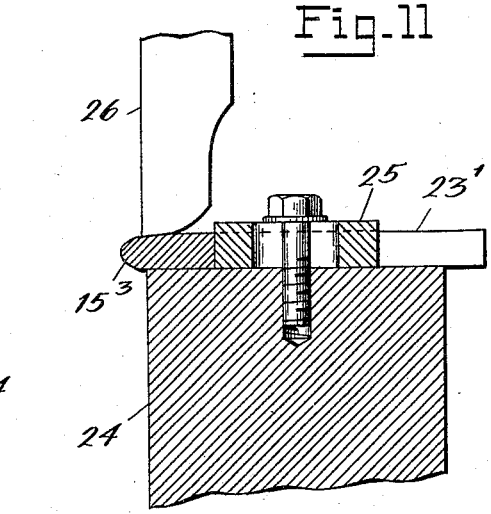
Inventor
Enoch Boone.
By his Attorneys
Bartlett + Brownell E. BOONE.
PROCESS FOR MAKING HORSESHOES AND THE LIKE.
APPLICATION FILED JUNE 15, 1915.
1,163,314.
Patented Dec. 7, 1915.
5 SHEETS—SHEET 4.
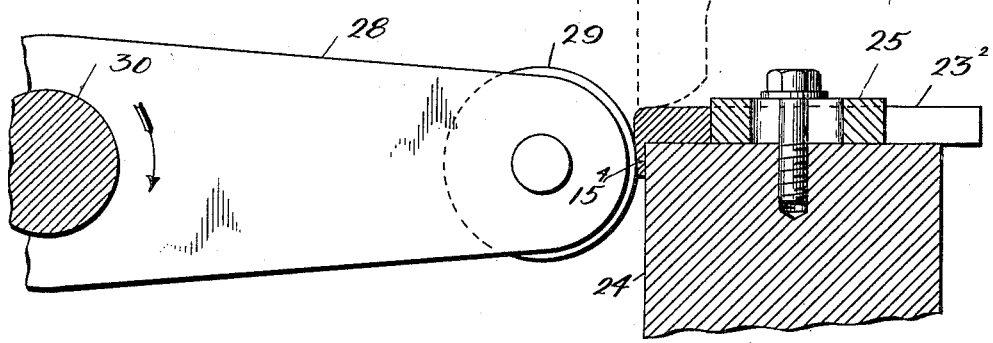
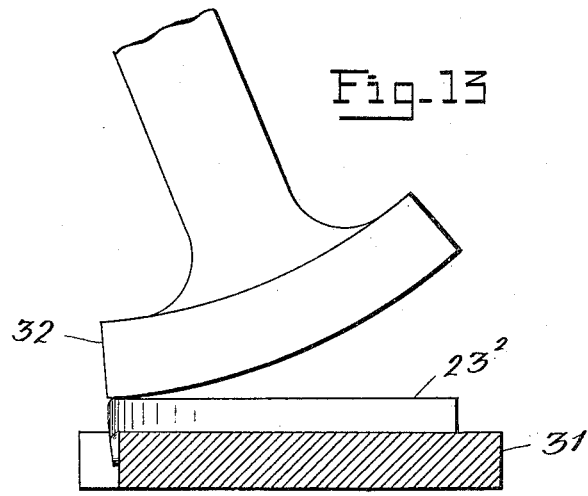
Inventor
Enoch Boone.
By his Attorneys E. BOONE.
PROCESS FOR MAKING HORSESHOES AND THE LIKE.
APPLICATION FILED JUNE 15, 1915.
1,163,314.
Patented Dec. 7, 1915.
5 SHEETS—SHEET 5.
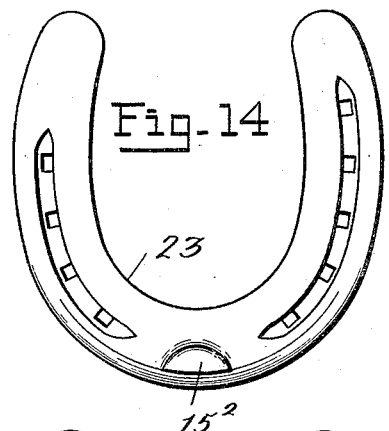
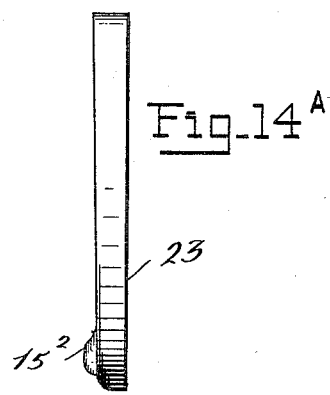
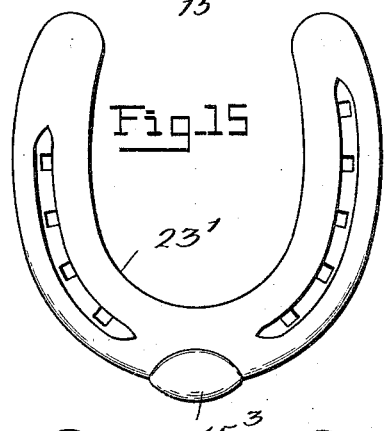
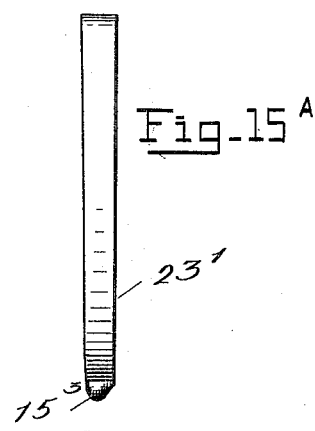
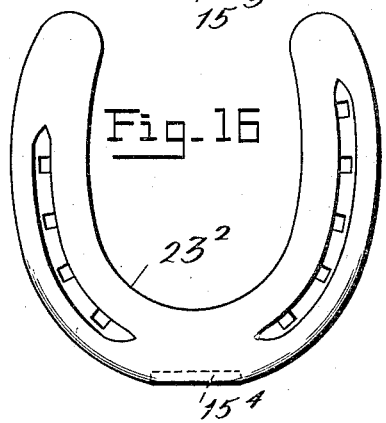
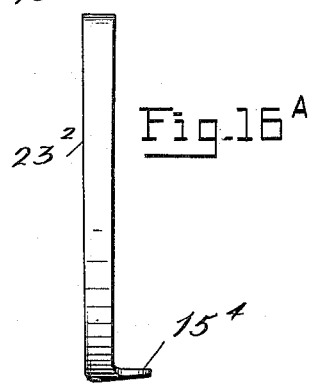
Inventor
Enoch Boone.
By his Attorneys
Bartlett Brownell

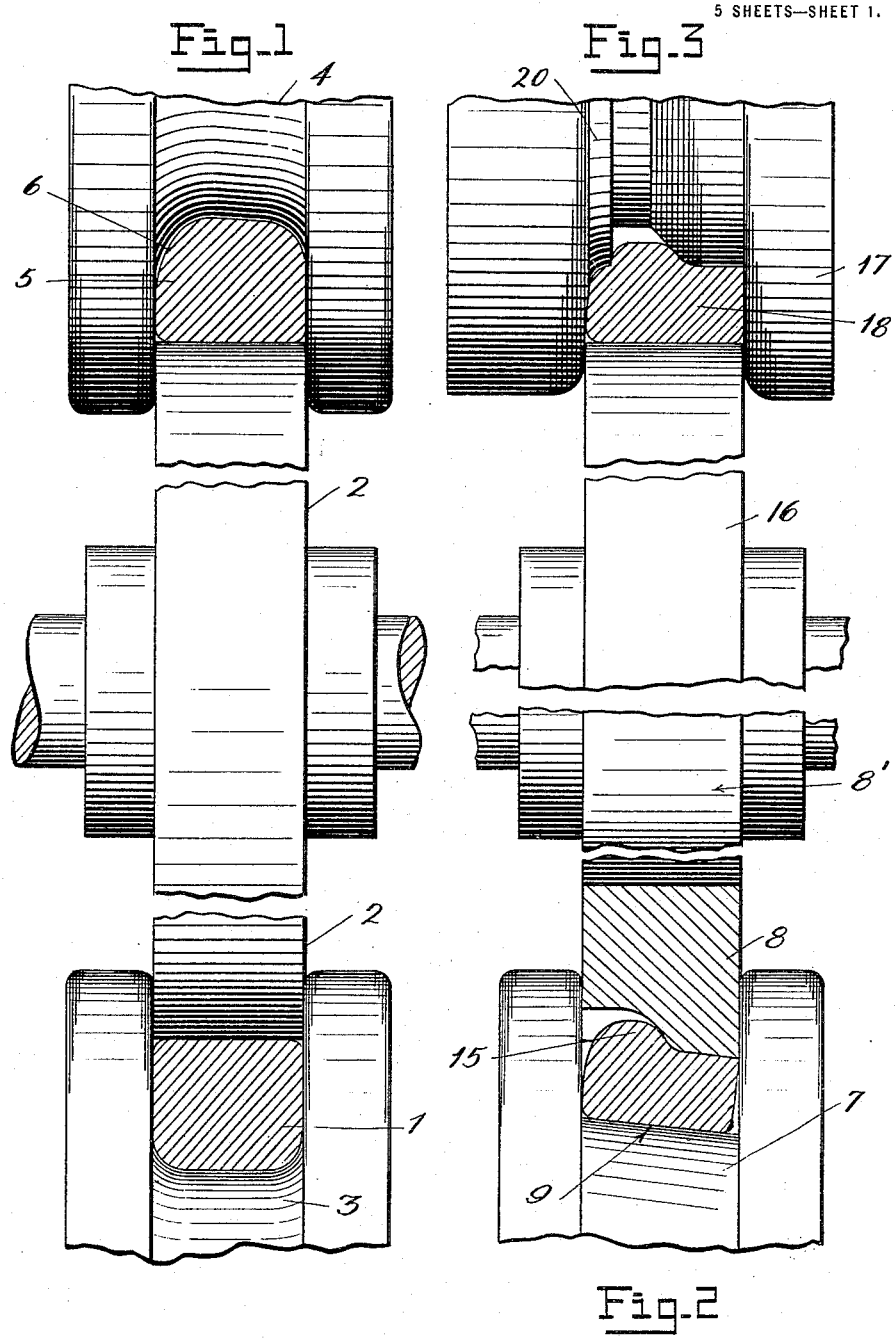

UNITED STATES PATENT OFFICE.

ENOCH BOONE, OF POUGHKEEPSIE, NEW YORK, ASSIGNOR TO PHOENIX HORSE SHOE COMPANY, OF POUGHKEEPSIE, NEW YORK, A CORPORATION OF ILLINOIS.

PROCESS FOR MAKING HORSESHOES AND THE LIKE.

1,163,314.            Specification of Letters Patent.          Patented Dec. 7, 1915.

Application filed June 15, 1915. Serial No. 34,136.

*To whom it may concern:*

Be it known that I, ENOCH BOONE, a citizen of the United States, residing at Poughkeepsie, New York, have invented a certain new and useful Improvement in Processes for Making Horseshoes and the like, of which the following is a full, clear, and exact description.

My invention relates to improvements in the process of making horse shoes, mule shoes, and the like, and has for its object to produce, from bar iron, horse shoes and the like having toe clips formed thereon without weakening or reducing the body of the shoe adjacent to the clip.

Heretofore in making clip horse shoes from bar iron a portion of the metal from the body of the shoe has been used to form the toe clip, thus weakening the shoe, reducing its wearing surface and its life. In shoes made by my process the body of the shoe is left intact so as to be substantially uniform in contour at the point adjacent to the clip.

The following is a description of my process as carried out in making single clip shoes and of apparatus for carrying out said process and of the product formed thereby, reference being had to the accompanying drawings, in which—

Figure 1 represents a series of three rolls producing the first two steps of my process. Fig. 2 represents portions of two rolls performing the next step, the rim of one of the rolls being shown in section. Fig. 3 represents portions of two other rolls performing the fourth step. Fig. 4 shows a side elevation of a portion of the upper roll of Fig. 2 and a portion of a rod being rolled thereby. Fig. 5 is a plan view of a bar after it has passed between the two lower rolls of Fig. 1, said bar being shown in section in the lower portion of Fig. 1. Fig. 6 shows a plan view of the bar after it has passed through the two upper rolls of Fig. 1, the section of the bar being shown in the upper part of Fig. 1. Fig. 7 is a plan view of the bar after it has passed through the rolls shown in Fig. 2, a section of the bar on the line 2—2 Fig. 7 being shown in Fig. 2. Fig. 8 is a plan view of the bar after it has passed through two rolls shown in Fig. 3, a section of the bar on line 3—3 Fig. 8 being shown in Fig. 3. Fig. 9 shows a plan view of one of the horse shoe blanks, cut from the bar of Fig. 8, in the bending machine. Fig. 10 shows the bent shoe blank on the bed of a plunger swaging press, with the plunger in raised position. Fig. 11 shows the shoe blank in the plunger swaging press after the plunger has descended. Fig. 12 shows the blank in the last named press acted upon by a toe-clip-forming wiper arm. Fig. 13 shows the blank in an ironing press. Figs. 14 and 14$^a$ show a plan and side elevation of the product formed by the apparatus of Fig. 9. Figs. 15 and 15$^a$ show a plan and side elevation of the product formed by the step represented in Fig. 11. Figs. 16 and 16$^a$ show a plan and side elevation of the product formed by the step represented in Fig. 12.

In carrying out my process long bars are rough rolled into approximately the shape shown at 1 in Fig. 1. One of these bars is then passed through rolls 2 and 3 and is thereby rolled into the shape shown at 1 Fig. 1 and Fig. 5. They are then passed back between rolls 2 and 4 and are rolled into the shape shown at 5 in Fig. 1, the left hand upper corner of the bar being given a slanting face 6. The bar is then sent between the rolls 7 and 8, the latter being made up of a ring, having a peculiar face hereafter described, and mounted on a disk or mandrel 8'. The lower roll 7 has a slightly conical face 9 and the upper roll is provided with a recess 10 and two series of projections 11 which are mounted on a flange 12. The flanges 12 cut part way into the metal forming elongated recesses, as shown at 13 in Figs. 4 and 7 and the projections 11 produce series of depressions 14 located at the bottom of the recess formed by the flange 12 and partly penetrating the bar. Flange 12 is of such shape as to form the recess 13 and the projections 11 are of such shape as to form square holes 14 in the bottom thereof. The number of projections 11 correspond to the desired number of nail holes in the shoe, there being in the shoe described herein four such nail holes on one side and five nail holes on the other side. The recess 10 is of such shape as to form a nib or boss 15 between the two recesses 13. A section of the bar through the boss 15 on the line 2—2 Fig. 7 is shown in Fig. 2. The bar of Fig. 7 is then passed between the rolls 16 and 17 producing the bar 18, a section of which through the line 3—3 Fig. 8 is shown in Fig. 3. All these rolling processes are done during one heat of the bar. The bar in passing between the rollers 16 and 17 is squeezed up so as to partly close the recesses 13, reducing them to the shape shown at 19 in Fig. 8. The flange 20 on the roll 17 rounds the upper forward edge of the blank and crowds the forward edge of the boss 15 slightly backward, as shown at 15' in Fig. 8.

After the bar has passed between the rollers 16 and 17 it is cut off in the proper lengths 21 (Fig. 9), said lengths forming horse shoe blanks each adapted to form a horse shoe. These horse shoe blanks are then put in a bending press, having a former 22 and two bending arms 23$^a$, which, in the usual manner, act upon the metal to impart to the horse shoe blank 21 the curve desired with the boss 15$^2$. Figs. 14 and 15$^a$ show the horse shoe blank after it has been passed through the bending machine, the same being marked 23.

After the horse shoe blank has passed through the bending machine so as to form a bent horse shoe blank, it is put in a clip forming machine illustrated in Fig. 12. This clip forming machine has a bed 24 having a guide 25 for positioning the bent horse shoe blank 23 thereon. It is also provided with a plunger 26 adapted to descend and hit the boss 15$^2$ upon the bent horse shoe blank as shown in Fig. 11. The result of this action is to force the boss 15$^2$ downward causing the metal to be displaced and form a lateral projection 15$^3$, forming the product 23' shown in Figs. 15 and 15$^a$. The plunger 26 then rises to the position shown in Fig. 12 and a swinging wiper 28 provided with a roller 29 and revolving about an axis 30 is swept around clock-wise, so as to hit the displaced portion 15$^3$ and wipe it down so as to form the clip 15$^4$, forming the product 23$^2$ as shown in Figs. 16 and 16$^a$. This forms the clip 15$^4$ without weakening the body of the shoe, leaving the contour of the shoe at the portion adjacent to the clip substantially uniform. After the clip 15$^4$ is thus formed the rough shoe is placed upon an ironing table 31 and pressed out by a pressing member 32 so as to true up the legs of the U-shaped horse shoe, causing them to lie in the same plane. The horse shoe is then complete as a commercial product except for the completion of the punching of the holes at 14 which is done in the ordinary manner.

As will be seen from the foregoing sufficient metal is provided at the center of the horse shoe blank for the making of the clip 15$^4$ without weakening the toe of the shoe by forming the boss 15$^2$, a portion of the metal at the point where the clip is to be produced being swaged out and formed into the clip, leaving the contour of the shoe adjacent to the clip substantially uniform. The horse shoe blanks before bending are preheated, the heat then imparted being sufficient to last during the bending, clip forming and pressing stages.

As will be evident to those skilled in the art, my invention permits of various modifications without departing from the spirit thereof or the scope of the appended claims.

What I claim is:

1. In the process of forming horse shoes and the like from an iron bar, the improvement which consists in rolling into the bar a series of elongated recesses and a boss located between two adjacent recesses, said boss extending in the opposite direction to the direction in which said recesses extend into said bar and rising above the plane of the edges of said recesses, cutting a horse shoe blank from said bar, bending said horse shoe blank, displacing metal constituting said boss and the adjacent portion of the body of the bent horse shoe blank laterally until said projection is reduced to substantially the level of the main portion of the bent horse shoe blank and forming said displaced metal into a clip extending in the opposite direction from that in which said projection extended.

2. In the process of forming horse shoes and the like from an iron bar, the improvement which consists in forming a horse shoe blank, having a vertical local projection, acting on said projection and the adjacent portion of the body of the horse shoe blank so as to form a lateral projection extending at right angles to said first mentioned projection and forming said lateral projection into a clip.

3. In the process of forming horse shoes and the like from an iron bar, the improvement which consists in rolling into the bar a series of elongated recesses and a boss located between two adjacent recesses and adjacent to the front edge of the bar, and acting upon said projection and the adjacent portion of the body of the horse shoe blank, so as to form a portion of the metal comprising the same into a clip.

4. In the process of forming horse shoes and the like from an iron bar, the improvement which consists in rolling into the bar a series of elongated recesses and a boss located between two adjacent recesses and adjacent to the front edge of the bar, and acting upon said projection and the adjacent portion of the body of the horse shoe blank, so as to form a portion of the metal comprising the same into a clip, the clip extending in the opposite direction from said projection.

5. The improvement in the process of forming horse shoes which consists in forming from a bar a horse shoe blank whose body is of substantially uniform thickness and has a portion laterally projecting therefrom and confined to the central part thereof, and forming said laterally projecting portion into a clip.

6. The improvement in making horse shoes and the like which consists in rolling into a bar of iron a series of elongated grooves and a boss located between said grooves, compressing said bars laterally so as to partially close said recesses without obliterating said boss, displacing a portion of the metal constituting said boss and the section of said bar adjacent thereto so as to form a lateral projection, and forming said lateral projection into a clip.

ENOCH BOONE.

Copies of this patent may be obtained for five cents each, by addressing the "Commissioner of Patents, Washington, D. C."

It is hereby certified that in Letters Patent No. 1,163,314, granted December 7, 1915, upon the application of Enoch Boone, of Poughkeepsie, New York, for an improvement in "Processes for Making Horseshoes and the Like," an error appears in the printed specification requiring correction as follows: Page 2, line 19, for the numeral "15ᵃ" read *14ᵃ;* and that the said Letters Patent should be read with this correction therein that the same may conform to the record of the case in the Patent Office.

Signed and sealed this 18th day of January, A. D., 1916.

[SEAL.]

J. T. NEWTON,

*Acting Commissioner of Patents.*

Cl. 59—61.